United States Patent
Burgschat et al.

(10) Patent No.: US 7,123,354 B2
(45) Date of Patent: Oct. 17, 2006

(54) OPTICAL POSITION MEASURING DEVICE

(75) Inventors: Reiner Burgschat, Jena (DE); Janos Böhme, Jena (DE); Manfred Matz, Jena (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 220 days.

(21) Appl. No.: 10/474,231

(22) PCT Filed: Mar. 28, 2002

(86) PCT No.: PCT/EP02/03475

§ 371 (c)(1),
(2), (4) Date: May 3, 2004

(87) PCT Pub. No.: WO02/082021

PCT Pub. Date: Oct. 17, 2002

(65) Prior Publication Data

US 2004/0189984 A1    Sep. 30, 2004

(30) Foreign Application Priority Data

Apr. 3, 2001   (DE) ................. 101 16 599

(51) Int. Cl.
*G01B 11/26* (2006.01)
*G01C 1/00* (2006.01)

(52) U.S. Cl. .................. 356/139.03; 356/139.01; 356/141.1; 356/152.1; 356/614; 250/231.1; 33/1 P; 33/1 N (58) Field of Classification Search ........... 356/139.03
See application file for complete search history.

(56) References Cited

U.S. PATENT DOCUMENTS 3,904,295 A * 9/1975 Hock et al. ............... 356/398

(Continued)

FOREIGN PATENT DOCUMENTS

DE   195 27 287 A1   1/1997

(Continued)

OTHER PUBLICATIONS

Reiner Burgschat "Die Neue Dimension in der Weg- und Winkelmesstechnik," F&M, vol. 104, No. 10, 1996, pp. 752-754 and 756.

(Continued)

*Primary Examiner*—Thomas H. Tarcza
*Assistant Examiner*—Luke Ratcliffe
(74) *Attorney, Agent, or Firm*—Brinks Hofer Gilson & Lione (57) ABSTRACT

An optical position measuring arrangement that includes an incremental measuring graduation and a scanning unit, which can be moved in relation to the incremental measuring graduation along a measuring direction and by which position-dependent incremental signals are generated from scanning the measuring graduation. The scanning unit includes a transparent support substrate and two incremental signal scanning arrangements arranged in the measuring direction. Each of the incremental scanning arrangements includes a light source and several incremental signal detector elements, wherein the incremental signal scanning arrangements are arranged on a side of the support substrate facing away from the incremental measuring graduation. The scanning unit includes several fields with scanning gratings, each field is spatially assigned to corresponding incremental signal detector elements and is arranged between the incremental signal scanning arrangements and the support substrate, wherein the scanning gratings are arranged so that partial incremental signals with predetermined phase relations are generated from the incremental signal detector elements.

20 Claims, 4 Drawing Sheets

U.S. PATENT DOCUMENTS

| | | |
|---|---|---|
| 5,666,196 A | 9/1997 | Ishii et al. |
| 5,841,134 A | 11/1998 | Burgschat et al. |
| 6,476,380 B1 | 11/2002 | Burgschat |
| 6,525,311 B1 | 2/2003 | Burgschat et al. |
| 6,545,262 B1 | 4/2003 | Burgschat |
| 6,747,262 B1 * | 6/2004 | Willhelm .................. 250/208.2 |

FOREIGN PATENT DOCUMENTS

| | | |
|---|---|---|
| DE | 198 55 828 A1 | 6/2000 |
| DE | 199 21 309 A1 | 11/2000 |
| DE | 100 28 136 A1 | 12/2000 |

OTHER PUBLICATIONS

Numerik Jena Company Brochure entitled "Optical Encoder Systems by Numerik Jena Encoder-Kit L," published by Numerik Jena, Mar. 1999, 8 pages.

* cited by examiner

OPTICAL POSITION MEASURING DEVICE

Applicants claim, under 35 U.S.C. §§ 120 and 365, the benefit of priority of the filing date of Mar. 28, 2002 of a Patent Cooperation Treaty patent application, copy attached, Ser. No. PCT/EP02/03475, filed on the aforementioned date, the entire contents of which are incorporated herein by reference, wherein Patent Cooperation Treaty patent application Ser. No. PCT/EP02/03475 was not published under PCT Article 21(2) in English.

Applicants claim, under 35 U.S.C. § 119, the benefit of priority of the filing date of Apr. 3, 2001 of a German patent application, copy attached, Ser. No. 101 16 599.4, filed on the aforementioned date, the entire contents of each of which are incorporated herein by reference.

BACKGROUND OF THE INVENTION

1. Field of the Invention

The present invention relates to an optical position measuring device.

2. Description of the Related Art

A miniaturized scanning unit for an optical position measuring device suitable for incident light-scanning of an incremental measuring graduation is known from the publication New Dimensions in Position and Angular Measuring Technology by R. Burgschat in F & M 104, 1996, 10, pp. 752 to 756. Inter alia, the scanning device includes an incremental signal scanning arrangement placed on a support substrate. The incremental signal scanning arrangement essentially includes a photodiode array with a multitude of incremental signal detector areas and a centrally arranged light source. Details regarding the structure of the incremental signal scanning arrangement can also be found in DE 195 27 287 A1.

A second photodiode array for generating reference pulses is arranged next to the first photodiode array for generating incremental signals and spaced apart from the first array in the measuring direction. An alternative variation for generating a reference pulse signal in such a scanning unit is moreover known from DE 199 21 309 A1.

Besides position measuring devices with only a single incremental signal scanning arrangement on the side of the scanning unit, a longitudinal measuring system is known from the company publication "Encoder-Kit L" of NUMERIK Jena GmbH with the designation "Kit L-D-03/99", published in March of 1999, wherein two such incremental signal scanning arrangements are provided, clearly spaced apart from each other, on a common support substrate. A continuous scanning grating for the two incremental signal scanning arrangements is arranged on the underside of the support substrate which faces the scanned measuring graduation. The generation of phase-shifted partial incremental signals from the multitude of the incremental signal detector areas takes place by an appropriate relative arrangement of the incremental signal detector areas with respect to each other.

In systems with only a single incremental signal scanning arrangement in the scanning unit, the resultant sensitivity regarding dirt on the measuring graduation has shown itself to be particularly disadvantageous. The reason for this is a relatively small scanning field on the scale. Faulty measurements are the result, if during the measuring operation the scanning field is occupied by dirt particles.

In connection with the systems with two spaced apart incremental signal scanning arrangements also mentioned above, it is considered to be disadvantageous that only a limited operating temperature range is available because of the different thermal coefficients of expansion of the scale and the scanning unit. This is based on the fact that because of the large distance between the incremental signal scanning arrangements it is no longer assured in case of temperature-related position changes that the predetermined phase positions on the various detector elements remain the same. Furthermore, a definite effect on the signal amplitudes, as well as the signal offset, still results in case of dirt on the measuring graduation.

SUMMARY AND OBJECTS OF THE INVENTION

It is therefore an object of the present invention to disclose an optical position measuring device which can be miniaturized as much as possible, and assures a dependable generation of position-dependent scanning signals as well.

This object is attained by an optical position measuring arrangement that includes an incremental measuring graduation and a scanning unit, which can be moved in relation to the incremental measuring graduation along a measuring direction and by which position-dependent incremental signals are generated from scanning the measuring graduation. The scanning unit includes a transparent support substrate and at least two incremental signal scanning arrangements arranged in the measuring direction, each of the at least two incremental scanning arrangements includes a light source and several incremental signal detector elements arranged distributed around the light source, by which partial incremental signals are generated from scanning of the incremental measuring graduation, wherein the at least two incremental signal scanning arrangements are arranged on a side of the support substrate facing away from the incremental measuring graduation. The scanning unit further includes several fields with scanning gratings, each of the several fields is spatially assigned to corresponding ones of the incremental signal detector elements and is arranged between the at least two incremental signal scanning arrangements and the support substrate, wherein the scanning gratings are arranged in such a way that partial incremental signals with predetermined phase relations are generated from the incremental signal detector elements.

In accordance with the present invention, at least two incremental signal scanning arrangements with two light sources are now arranged immediately next to each other in the measuring direction on a transparent support substrate. The generation of phase-shifted partial incremental signals from the incremental signal detector elements takes place by the spatially defined assignment of scanning gratings to the individual detector elements. In this case different fields with scanning gratings are arranged between the side of the support substrate facing away from the measuring graduation and the incremental signal detector elements.

It can be stated as a considerable advantage of the position measuring device in accordance with the present invention that, besides the extremely compact construction of the system, because of the illumination of the scanned measuring graduation by at least two light sources and the provision of an increased number of incremental signal detector elements, the incremental signals are now obtained from many signal portions from different scanning locations on the measuring graduation. Isolated dirt particles on the measuring graduation therefore have only little effect on the quality of the resulting measuring signals, in particular their amplitude. Because of the multiple illumination, a substantially larger field of the measuring graduation is scanned in the course of the generation of the scanning signals, without it being necessary to have to clearly increase the size of the individual incremental signal scanning arrangements, or to provide clearly more incremental signal detector elements. In the end, the illumination of the measuring graduation by several light sources is the prerequisite for the extremely compact construction of the scanning unit.

It can be stated as a further advantage that, because of the assignment of a suitable scanning grating to each individual incremental signal detector element, it is now possible to assure that the respective partial incremental signal has the correct phase position. Because of distortion effects in the scanned strip pattern, this is not assured in the case wherein a common scanning grating is used for all incremental signal detector elements.

In an advantageous embodiment of the position measuring device, several respective reference pulse detector elements are additionally arranged laterally adjoining the at least two incremental signal scanning arrangements. The generation of reference pulse signals at defined positions along the measuring track is possible with the aid of the reference pulse detector elements. Moreover, still another light source is arranged on each side in the area of the reference pulse detector elements, so that there are separate light sources for scanning the incremental measuring graduation and the reference markings. By the employment of separate light sources for generating the incremental signals and the reference pulse signals it is possible to arrange the respective scanning tracks on the scale even further apart from each other without it being necessary to have to clearly increase the size of the individual incremental signal scanning arrangements, or to provide clearly more incremental signal detector elements. In this way a greater lateral offset as a whole of the scanning unit with respect to the scale can also be tolerated without it being necessary to construct too large an incremental signal scanning arrangement.

If transmission gratings are respectively arranged in front of the additional light sources in the area of the reference pulse detector elements, as well as in front of the light sources in the incremental signal scanning arrangements, which correspond to transmission gratings in front of the light sources of the incremental signal scanning arrangements, substantial portions of the radiation from these light sources can also be used for generating incremental signals. The scanning surface on the measuring graduation is again increased by this and also contributes to a reduction of the sensitivity to dirt.

Because of the provision of several respective reference pulse detector elements on both sides of the incremental signal scanning arrangements, an increased flexibility furthermore results with respect to the generation of reference pulse signals. For example, all reference pulse detector elements on one side can be interconnected and thus be used for scanning a coded reference marking; alternatively to this, the inner reference pulse detector elements can be used as difference photo-receivers for scanning simple dash-shaped reference markers, while the remaining reference pulse detector elements are employed as compensation detector elements in a known manner.

It is of course possible to lay out the position measuring device in accordance with present the invention for linear, as well as rotary, applications. It is also not a problem to lay out the position measuring device in accordance with the present invention for different measuring graduation periods.

Further advantages, as well as details of the present invention ensue from the following description of an exemplary embodiment by the attached drawings.

Shown here are in.

BRIEF DESCRIPTION OF THE DRAWINGS

DESCRIPTION OF THE PREFERRED EMBODIMENT(S) OF THE INVENTION

Figure 1:
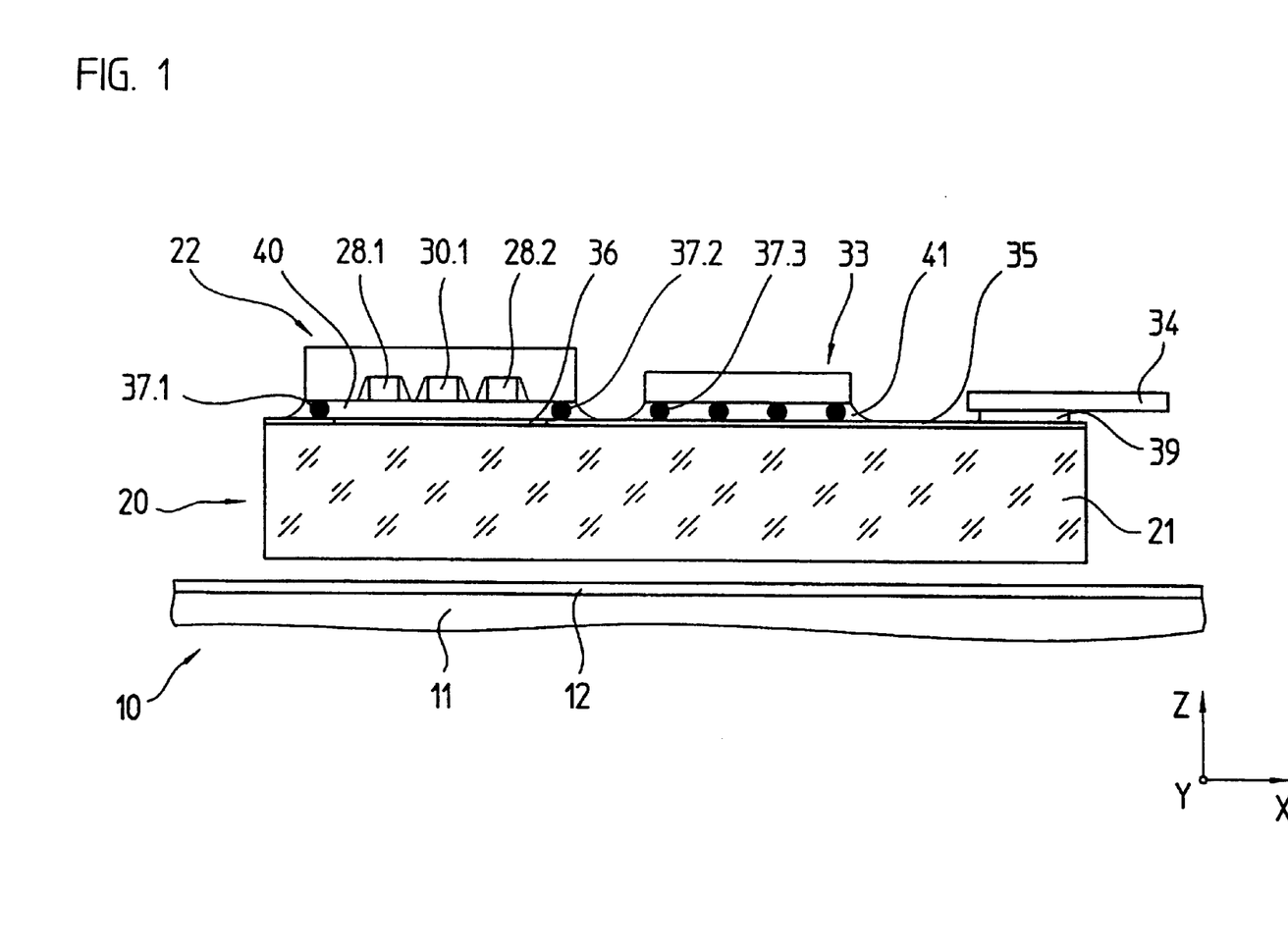
FIG. 1 shows a schematic lateral plan view of an exemplary embodiment of a position measuring device in accordance with the present invention.

A schematic representation of an exemplary embodiment of the optical position measuring device in accordance with the invention is represented in FIG. 1. In addition to a scanning unit 20, it includes a scale 10 with the scanned incremental measuring graduation 12. The scale 10 used is shown in a view from above in FIG. 2.

The scanning unit 20 and the scale 10 with the measuring graduation 12 are arranged so they can be displaced with respect to each other in the measuring direction x shown, thus, the measuring direction x is oriented parallel with respect to the drawing plane in FIG. 1.

The represented exemplary embodiment of the optical position measuring device is used for detecting linear relative movements between the scanning unit 20 and the scale 10, or measuring graduation 12. An appropriately embodied position measuring device can be employed in a numerically-controlled machine tool, for example. The position-dependent scanning signals are transmitted for further processing to an evaluation unit, not represented, for example a numerical machine tool control device.

Alternatively to the linear variation shown, the position measuring device in accordance with the present invention can of course also be modified for detecting rotary relative movements, etc.

Figure 2:
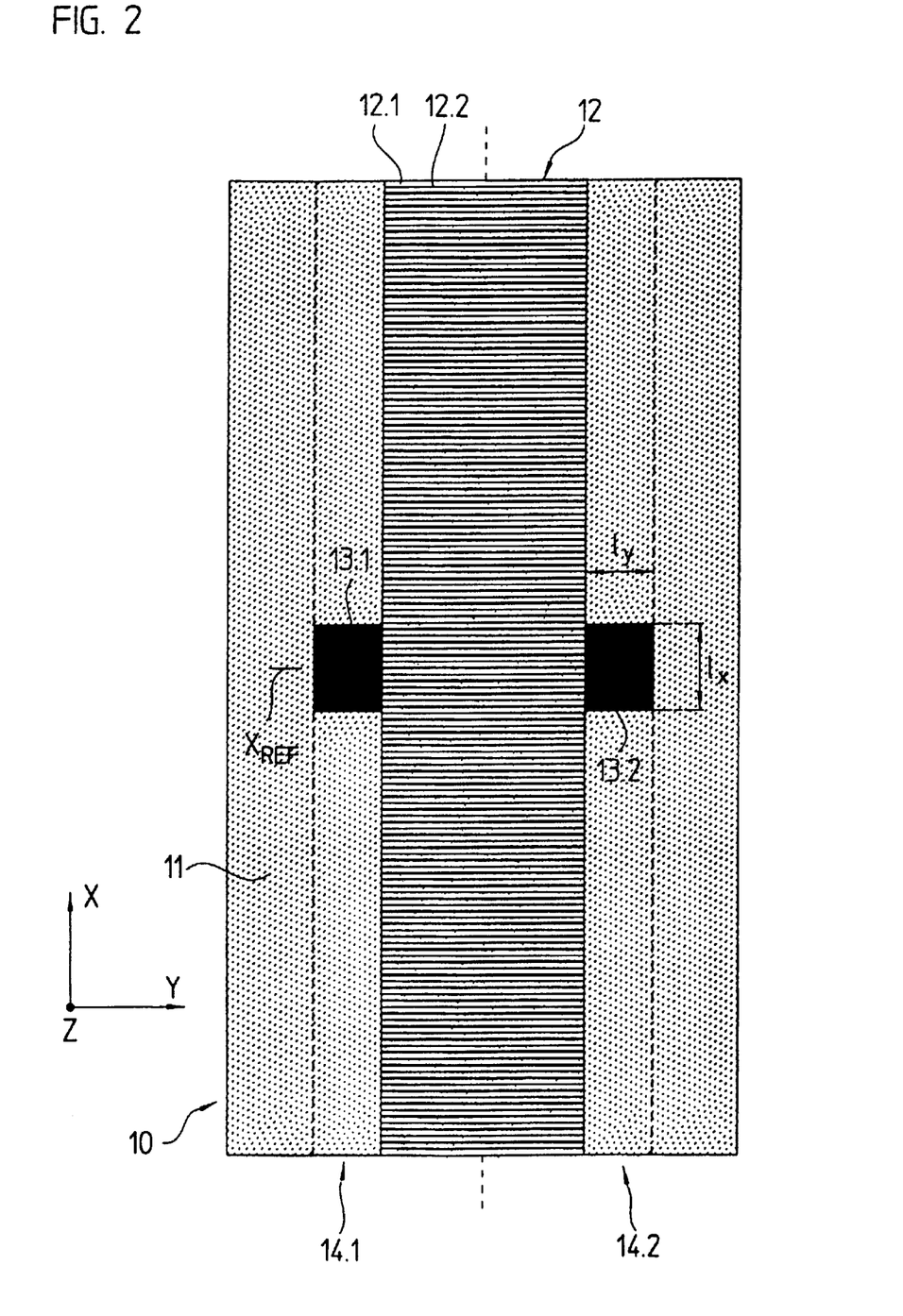
FIG. 2 shows a view from above on the scanned measuring graduation of the position measuring device shown in FIG. 1.

In the present exemplary embodiment, the scale 10 used includes a support body 11, on the center of which a track with the incremental measuring graduation 12 is arranged in the measuring direction x. Periodically arranged reflecting partial areas 12.1 and non-reflecting partial areas 12.2 extend in the measuring direction x in the incremental measuring graduation 12, whose longitudinal axes are each oriented in the indicated y-direction, i.e. perpendicularly with respect to the measuring direction x. In a possible embodiment, the graduation period $TP_M$ of the incremental measuring graduation 12 is for example selected to be $TP_M=20$ μm. A metal tape, for example, can be used as the support body 11, on which the partial areas 12.1, 12.2 with the appropriate optical properties are embodied in the area of the incremental measuring graduation 12.

Here the type of material the scale 10 is made of is not essential for the present invention, i.e. in principle the scale 10, or the incremental measuring graduation 12, can be produced alternatively to the indicated embodiment.

Two reference markings 13.1, 13.2 at a reference position XREF in two reference marking tracks 14.1, 14.2 are furthermore arranged laterally adjoining the incremental measuring graduation 12 in the example shown. An unequivocal absolute position along the measuring track is defined with the aid of the reference markings 13.1, 13.2, through which the absolute relationship of the high-resolution incremental measurement can be provided in a known manner.

It is of course also possible to arrange such reference markings 13.1, 13.2 in pairs at appropriate reference positions $X_{REF}$ of the scale 10 also at further locations along the reference marking tracks 14.1, 14.2. It is also possible to provide so-called distance-coded reference markings, etc.

In the exemplary embodiment shown, the two reference markings 13.1, 13.2, which are arranged laterally adjoining with respect to the incremental graduation track 12, have a length $l_x$=500 µm in the measuring direction x, the length $l_y$ of the reference markings 13.1, 13.2 in the direction of the bars of the incremental graduation track 12 is selected to be $l_y$=1 mm, for example.

In this example, the reference markings 13.1, 13.2 are embodied as non-reflecting areas on the otherwise reflecting support body 11.

Alternatively to this it is also possible to reverse the arrangement of reflecting and non-reflecting areas, so that in this case only the reference markings 13.1, 13.2 act reflectingly, while the rest of the reference marking tracks 14.1, 14.2 is laid out to be non-reflecting. Such a variant is advantageous because the sensitivity to dirt in the course of generating reference pulse signals can be again reduced by this, since possible dirt particles on the scale do not scatter the impinging light as a rule and do not reflect in a directional manner.

The arrangement of two reference markings 13.1, 13.2 laterally adjoining with respect to the measuring graduation 12 offers advantages over the arrangement of a reference marking merely on one side. Thus, by this it is practically impossible for a local dirt deposit, for example, which also acts optically by reducing the reflection and is located next to the incremental graduation track 12, to be interpreted as a reference marking. Reference is also made in this connection to already mentioned DE 199 21 309 A1.

In the schematic representation in FIG. 1, a number of components can be seen on the part of the scanning unit 20 of the position measuring device in accordance with the present invention. In connection with the description of the scanning unit 20, reference is also made here to FIGS. 3 and 4, which represent a plan view of the detector plane, as well as a view from above on the support substrate 21 of the scanning unit 20, together with further elements of the scanning unit 20.

The functionally relevant elements for generating the shift-dependent scanning signals are arranged on a transparent support substrate 21 in the scanning unit 20. The support substrate 21 is preferably composed of a suitable borosilicate glass material and, in a possible embodiment, has a thickness of approximately 1 mm; in this example the support substrate 21 has a rectangular cross section of the dimensions of 8 mm×14 mm.

In the present exemplary embodiment the components of the scanning unit 20 to be described in what follows are all arranged on the side of the support substrate 21 facing away from the measuring graduation 12 to be scanned. In the further course of the description this side will also be called the top, the side facing the measuring graduation will be called the bottom. An optical scanning chip 22 is essentially arranged on the top of the support substrate 21 and its structure will be described in detail in what follows, as well as a signal processing module 33, which further processes the scanning signals generated by the optical scanning chip 22 before they are passed on to a suitable evaluation unit. The signal processing module 33 is preferably embodied in the form of a suitable ASIC here.

In the area of the optical scanning chip 22, several sections on the support substrate 21 are embodied with grating structures 36, which are spatially assigned to various elements of the optical scanning chip 22 arranged above them. The various grating structures 36, which cannot be seen in detail in FIG. 1, are scanning gratings and transmitting gratings, each of which has been placed in a definite spatial arrangement in front of the opto-electronic incremental signal detector elements and the various light sources 28.1, 28.2, 30.1, 30.2 of the optical scanning chip 22. The grating structures are, for example, known amplitude gratings in the form of periodically arranged opaque chromium strips on the transparent support substrate 21.

The functions and the exact design of the grating structures 36 will be addressed in detail in the course of the following description.

Furthermore, a planar printed circuit board structure 35, or single level wiring, has been applied to further areas on the top of the transparent support substrate 21 and is used in a known manner for the electrical connection of the various optical, electrical and opto-electronic components with each other on the support substrate 21. The optical scanning chip 22 and the signal processing module 33 in particular are placed into contact with each other by this. The planar printed circuit board structure 35 is connected in an electrically conducting manner, for example in the manner of a soldered connection with solder bumps 39, with a flexible strip conductor 34 at the edge of the support substrate 21. The scanning unit 20 is connected via the flexible strip conductor 34 with a downstream arranged evaluation unit, for example.

Alternatively to the flexible strip conductor 34 it would also be possible to provide a miniature plug connector, or a foil plug connector at this location of the support substrate 21.

It would also be conceivable to arrange the signal processing module on a level above the optical scanning chip, similar to a known arrangement in DE 198 55 828 A1, in order to provide a three-dimensional structure of the scanning unit in this way.

Figure 3:
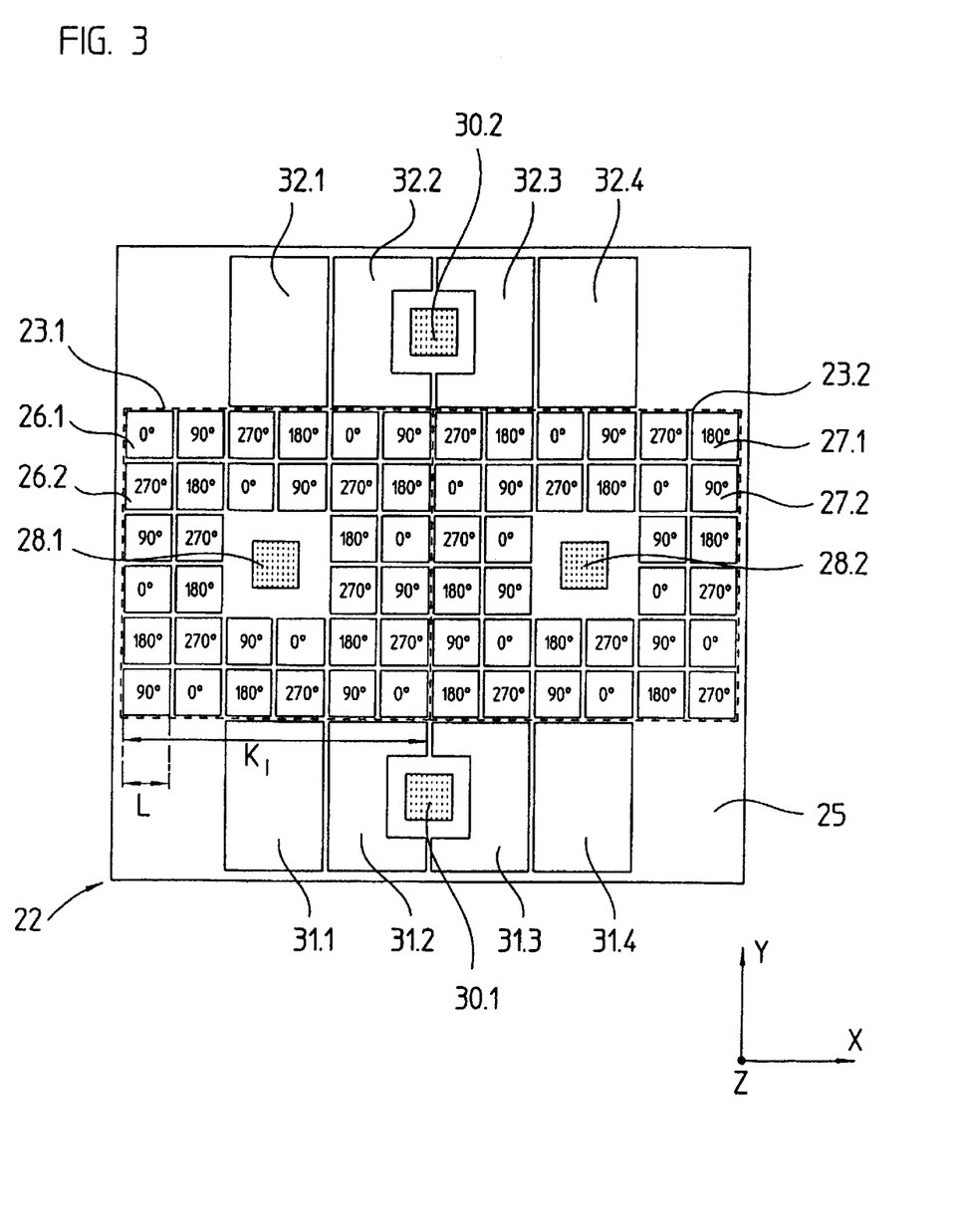
FIG. 3 shows a view from above on the detector plane of the scanning unit of the position measuring device shown in FIG. 1.

The optical scanning chip 22, as well as the signal processing module 33 are fastened on the support substrate 21 by known flip-chip techniques; some of the contacting pads 37.1, 37.2, . . . , made of SnPb solder or a lead-free solder alloy, can be seen in FIG. 1 in an area between the top of the support substrate 21 and the respective components 22, 33. Moreover, the spaces between the support substrate 21 and the components 22, 33 arranged on it are filled with a suitable underfilling 40, 41, so that a mechanical stabilization of the entire structure results. The construction in accordance with the present invention of the optical scanning chip 22 of an exemplary embodiment, whose detector plane is shown in FIG. 3 in a view from above, will now be explained in greater detail by FIG. 3.

In the present example, two incremental signal scanning arrangements 23.1, 23.2 of an approximately square shape are arranged on an optical scanning chip substrate 25 directly adjacent to or bordering each other in the measuring direction x. Each of the incremental signal scanning arrangements 23.1, 23.2 contains a centrally arranged light source 28.1, 28.2, for example a suitable LED, and several incremental signal detector elements 26.1, 26.2, 27.1, 27.2 arranged distributed around the light source 28.1, 28.2, and are embodied, for example, in the form of known photodiodes. In the course of scanning the measuring graduation, several phase-shifted partial incremental signals are generated by means-ef the various incremental signal detector elements 26.1, 26.2, 27.1, 27.2; in FIG. 3 the number assigned to each incremental signal detector elements 26.1, 26.2, 27.1, 27.2 indicates the respective relative phase position of the partial incremental signal resulting therefrom. Accordingly, in the example represented the generation of four different partial incremental signals is provided, which have the relative phase positions of 0°, 90°, 180° and 270°.

Basically an attempt is made to arrange the various incremental signal detector elements in such a way that the sum of the optical paths of the respective phase positions is as identical as possible. Moreover, the effects of possible tilts or twists of the scanning unit with respect to the scale on the phase-shifted partial incremental signals is intended to be compensated as much as possible by the arrangement of the incremental signal detector elements.

Equiphased partial incremental signals of the phase-shifted partial incremental signals generated in this way are interconnected via the mentioned wiring circuit 35 on the support substrate 21 and are made available for further processing in a known manner.

Further processing, for example in the form of signal amplification and signal interpolation, can already take place in the signal processing module 33 of the scanning unit 20. Besides this, alternative variations of signal processing are of course also possible in this module 33.

In the example represented, the light sources 28.1, 28.2 in the two incremental signal scanning arrangements 23.1, 23.2 are arranged in a suitably shaped cavity of the optical chip support substrate 25, such as can be seen, for example, in the lateral view in FIG. 1. This means that the light sources 28.1, 28.2 of the two incremental signal scanning arrangement 23.1, 23.2 are arranged co-planar with respect to the front face of the optical scanning chip 22, and the light-emitting front faces of the light sources 28.1, 28.2 do not project past this face.

In the exemplary embodiment shown, each one of the two incremental signal scanning arrangements 23.1, 23.2 includes a total $Z_{GES}=36$ square fields, each of which has an edge length $K_F=L$; the edges of the fields are oriented parallel, as well as at right angles with respect to the measuring direction x. In general, within a position measuring device in accordance with the invention, one incremental signal scanning arrangement 23.1, 23.2 has $Z_{GES}=n*4$ fields of the edge length L, wherein $n=1, \ldots, 6, 7, \ldots$; in the represented case $n=6$ therefore applies.

Thus, $K_I=n*L$ results as the edge length $K_I$ for an incremental signal scanning arrangement 23.1, 23.2.

Within the incremental signal scanning arrangements 23.1, 23.2, no detector elements, such as in all remaining fields, are provided in a central area of $Z_{LQ}=4$ fields; a light source 28.1, 28.2 has been placed in this central area in place of detector elements. Respectively $Z_{DET}=Z_{GES}-Z_{LQ}=32$ incremental signal detector elements 26.1, 26.2, ..., 27.1, 27.2 ... are arranged in the remaining surrounding fields. Altogether, the two incremental signal scanning arrangements 23.1, 23.2 of this example therefore have 64 incremental signal detector elements 26.1, 26.2, ..., 27.1, 27.2 ... The multitude of incremental signal detector elements 26.1, 26.2, ..., 27.1, 27.2 ... used contributes substantially to the insensitivity to dirt of the position measuring device in accordance with the present invention.

As can be furthermore seen in FIG. 3, several reference pulse detector elements 31.1 to 31.4, 32.1 to 32.4 are additionally arranged adjacent to the two incremental signal scanning arrangements 23.1, 23.2 of the exemplary embodiment represented. The various reference pulse detector elements 31.1 to 31.4, 32.1 to 32.4 are respectively sequentially arranged on each side in the measuring direction x. In the represented example, a total of four such reference pulse detector elements 31.1 to 31.4, 32.1 to 32.4 are provided on each side for generating a reference pulse signal from the scanning of an appropriate reference marking on the scale.

Furthermore, respective separate light sources 30.1, 30.2 are assigned to each group of four reference pulse detector elements 31.1 to 31.4, 32.1 to 32.4 in the optical scanning chip 22; again, an LED can be used as the light source 30.1, 30.2. The respective light source 30.1, 30.2 is arranged in the center of the four reference pulse detector elements 31.1 to 31.4, 32.1 to 32.4, to which end the two central reference pulse detector elements 31.2, 31.3, or 32.1, 32.3 have a corresponding U-shaped cutout.

The arrangement of the two light sources 30.1, 30.2 in the area of the reference pulse detector elements 31.1 to 31.4, 32.1 to 32.4 takes place analogously to that of the light sources 28.1, 28.2 of the two incremental signal scanning arrangements 23.1, 23.2, i.e. the two light sources 30.1, 30.2 are also arranged in cavities of the optical chip support substrate 25.

Figure 4:
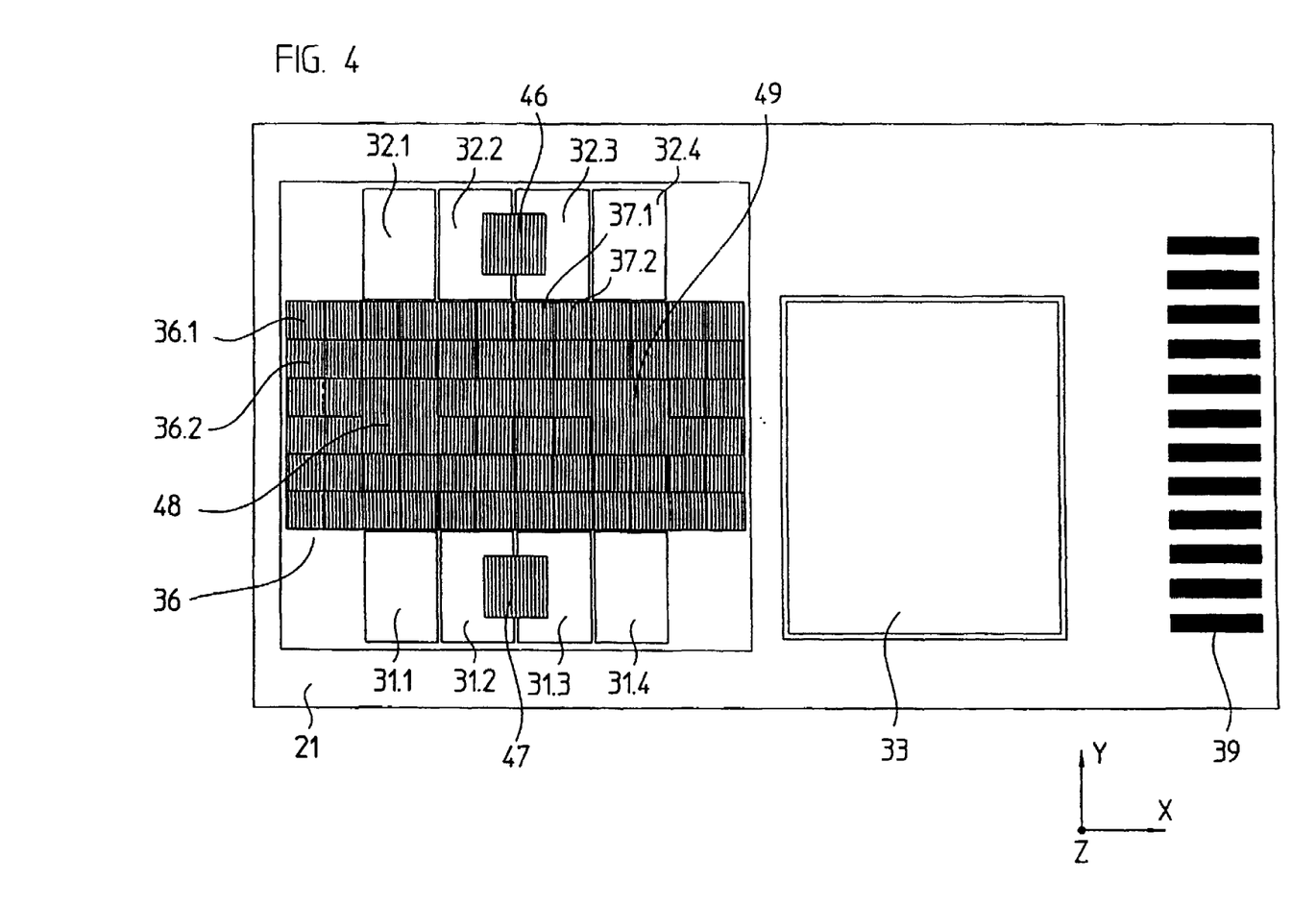
FIG 4 is a view from above on the support substrate of the scanning unit of the position measuring device shown in FIG. 1, together with the detector elements and light sources of the optical scanning chip.

As already indicated above, in the course of scanning the incremental measuring graduation, the different incremental signal detector elements 26.1, 26.2, ..., 27.1, 27.2 ... provide periodic partial incremental signals with the cited relative phase positions. In contrast to the system of the publication mentioned at the outset, the setting, or the generation of the various phase positions of the incremental scanning signals is now no longer provided by the arrangement, or placement, of the incremental signal detector elements 26.1, 26.2, ..., 27.1, 27.2 ... relative to the scanned periodic strip pattern in the detection plane, but by fields, or areas, with scanning gratings which are assigned, spatially defined, to the individual incremental signal detector elements 26.1, 26.2, ..., 27.1, 27.2 ... These respective fields with scanning gratings are arranged on the transparent support substrate 21 of the scanning unit 20, as can be seen in FIG. 4. FIG. 4 represents a view from above on the support substrate 21 of the scanning unit, wherein further components, such as parts of the optical scanning chip, of the signal processing module 33 and the solder bumps 39 for the flexible strip conductor, can be seen in addition in this representation.

The arrangement of a total of 64 fields with scanning gratings 36.1, 36.2, ..., 37.1, 37.2, ... on the support substrate 21 can be clearly seen in FIG. 4, i.e. on the support substrate 21 a scanning grating 36.1, 36.2, ..., 37.1, 37.2, ... is unequivocally assigned to each field in the optical scanning chip 22 with an incremental detector element. In the present example, all scanning gratings 36.1, 36.2, ... 37.1, 37.2, ... in the different fields have the same graduation period $TP_{AG}$, which corresponds to twice the graduation period $TP_M=20$ µm of the scanned incremental measuring graduation on the scale, i.e. $TP_{AG}=40$ µm.

The phase position of the detected partial incremental signal is set in the various incremental signal detector arrangements by the relative position of the various scanning gratings 36.1, 36.2, ..., 37.1, 37.2 ... For this purpose, the individual scanning gratings 36.1, 36.2, ..., 37.1, 37.2, ... in the various fields have offset distances from each other, which are dimensioned in a known manner and make possible the generation of partial incremental signals of phase positions of 0°, 90°, 180° and 270°. For example, the scanning gratings for generating partial incremental signals with the phase positions 0° and 90° have a distance $D_{0-90}=N*TP_M/4$, wherein N=1, 2, 3 . . . ; the distance $D_{0-180}$ between the 0° partial incremental signal and the 180° partial incremental signal is $D_{0-180}=N*TP_M/2$, wherein N=1, 2, 3 . . . , and the distance $D_{0-270}$ between the 0° partial incremental signal and the 270° partial incremental signal is $D_{0-270}=N*3/4*TP_M$, wherein N=1, 2, 3 . . . The distances, or offset distances in FIG. 4 are of course not true to scale.

As can also be seen in FIG. 4, further grating structures in the form of transmitting gratings 46, 47, 48, 49 are arranged on the support substrate 21 in the area of the total of four light sources, i.e. in front of the two light sources of the incremental signal scanning arrangements, as well as in front of the two light sources assigned to the reference pulse detector elements. In the present example, the graduation period $TP_{SG}$ of all four transmitting gratings 46 to 49 is selected to be identical to twice the graduation period $TP_M$ of the incremental measuring graduation and therefore corresponds to the graduation period TPAG of the scanning gratings 36.1, 36.2, . . . , 37.1, 37.2, i.e. $TP_{SG}$=40 μm.

Thus, in the explained exemplary embodiment of the scanning unit of the position measuring device in accordance with the invention, a total of four light sources 28.1, 28.2, 30.1, 30.2 with identical transmitting gratings 46 to 49 arranged in front of them are available, which assure the generation of a sufficiently large scanning field on the measuring graduation of the scale, and therefore contribute to the desired insensitivity to dirt.

Besides the explained example, further modifications of the position measuring device of the present invention are of course possible within the scope of the present invention.

It is thus possible, for example, to arrange more than two incremental signal scanning arrangements on the part of the scanning unit. In the same way it would be possible to modify the arrangement of the phase positions of the incremental signal detector elements in a suitable way within the scope of the present invention. It is furthermore also possible to provide alternative cross-sectional geometries for the incremental signal detector elements, or the incremental signal scanning arrangements.

Moreover, in principle it is also possible to employ a scanning unit as described above for transmitted light scanning of an appropriate measuring graduation; in this case it would only be necessary to deactivate the light sources in the optical scanning chip, while the arrangement of the detector elements could remain unchanged.

It should furthermore be mentioned that, alternatively to the terminology used so far, within the scope of the present invention it would be possible to speak of a single detector array in the scanning unit with a multitude of detector elements, wherein several light sources are assigned to the detector array, etc.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. An optical position measuring arrangement, comprising:
   an incremental measuring graduation;
   a scanning unit, which can be moved in relation to said incremental measuring graduation along a measuring direction and by which position-dependent incremental signals are generated from scanning said measuring graduation, and wherein said scanning unit comprises:
   a transparent support substrate;
   at least two incremental signal scanning arrangements arranged in said measuring direction, each of said at least two incremental scanning arrangements comprises a light source and several incremental signal detector elements arranged distributed around said light source, by which partial incremental signals are generated from scanning of said incremental measuring graduation, wherein said at least two incremental signal scanning arrangements are arranged on a side of said support substrate facing away from said incremental measuring graduation; and
   several fields with scanning gratings, each of said several fields is spatially assigned to corresponding ones of said incremental signal detector elements and is arranged between said at least two incremental signal scanning arrangements and said support substrate, wherein said scanning gratings are arranged in such a way that partial incremental signals with predetermined phase relations are generated from said incremental signal detector elements.

2. The optical position measuring device in accordance with claim 1, wherein said scanning gratings are arranged on said side of said support substrate which is oriented so it faces away from said incremental measuring graduation.

3. The optical position measuring device in accordance with claim 1, wherein each of said incremental signal scanning arrangements consists of $Z_{GES}$=n*4 fields, wherein n=1, 2, 3 . . . and $Z_{GES}$=total number of fields.

4. The optical position measuring device in accordance with claim 1, wherein each field has the shape of a square with edges having an edge length L, and said edges are oriented parallel, as well as at right angles with respect to said measuring direction.

5. The optical position measuring device in accordance with claim 4, wherein each of said at least two incremental signal scanning arrangements has a square shape and an edge length $K_1$=n*L.

6. The optical position measuring device in accordance with claim 3, wherein each of said light sources is arranged in the center of said at least two incremental signal scanning arrangements in the area of $Z_{LQ}$=k*4 fields, and is surrounded by $Z_{DET}=Z_{GES}-Z_{LQ}$ fields with incremental signal detector elements, wherein $Z_{LQ}$=number of light source fields and $Z_{DET}$=number of incremental detector element fields.

7. The optical position measuring device in accordance with claim 1, wherein said at least two incremental signal scanning arrangements are arranged directly adjoining each other in said measuring direction.

8. The optical position measuring device in accordance with claim 1, wherein each of said scanning gratings has the same graduation period.

9. The optical position measuring device in accordance with claim 8, wherein said scanning gratings, which are assigned to said incremental signal detector elements, each has a defined offset from each other in said measuring direction.

10. The optical position measuring device in accordance with claim 9, wherein said scanning gratings are arranged relatively offset per said at least two incremental signal scanning arrangements in such a way that respectively a plurality of four phase-shifted partial incremental scanning signals results.

11. The optical position measuring device in accordance with claim 1, wherein equiphased partial incremental signals from all of said at least two incremental signal scanning arrangements are interconnected.

12. The optical position measuring device in accordance with claim 1, wherein transmitting gratings are arranged on said support substrate in an area of said light sources of said at least two incremental signal scanning arrangements.

13. The optical position measuring device in accordance with claim 12, wherein a graduation period of said scanning gratings and a graduation period of said transmitting gratings are selected to be identical.

14. The optical position measuring device in accordance with claim 1, further comprising several reference pulse detector elements arranged sequentially in said measuring direction perpendicularly with respect to said measuring direction and adjoin both sides of said at least two incremental signal scanning arrangements.

15. The optical position measuring device in accordance with claim 14, wherein additional light sources are arranged in an area of said reference pulse detector elements.

16. The optical position measuring device in accordance with claim 14, wherewith respectively four reference pulse detector elements are arranged on both sides adjoining said at least two incremental signal scanning arrangements.

17. The optical position measuring device in accordance with claim 15, wherein transmitting gratings are arranged on said support substrate in an area of said additional light sources of said reference pulse detector elements.

18. The optical position measuring device in accordance with claim 17, wherein transmitting gratings are arranged on said support substrate in an area of said light sources and said transmitting gratings each have the same graduation period.

19. The optical position measuring device in accordance with claim 1, further comprising at least one signal processing module arranged on said side of said support substrate facing away from said measuring graduation.

20. The optical position measuring device in accordance with claim 1, further comprising a planar printed circuit board attached to said side of said support substrate facing away from said measuring graduation in order to electrically connect components on said support substrate.

* * * * *